United States Patent [19]

Lowe et al.

[11] 4,254,740

[45] Mar. 10, 1981

[54] HEAT EXCHANGE DEVICE

[76] Inventors: Wallace A. Lowe, 206 34th St., W.; Donald E. Robarts, 1311 32nd St., West, both of Fla.

[21] Appl. No.: 25,398

[22] Filed: Mar. 30, 1979

[51] Int. Cl.³ .............................................. F22B 1/02
[52] U.S. Cl. ...................................... 122/32; 165/74; 165/163; 165/174; 126/435
[58] Field of Search ............... 165/132, 74, 163, 174; 237/19; 122/32, 33; 126/435

[56] References Cited

U.S. PATENT DOCUMENTS

| | | | |
|---|---|---|---|
| 1,925,446 | 9/1933 | Huntley | 165/132 X |
| 1,937,335 | 11/1933 | Foley | 122/32 |
| 3,830,293 | 8/1974 | Bell | 165/174 |

Primary Examiner—Albert W. Davis
Attorney, Agent, or Firm—Arthur W. Fisher, III

[57] ABSTRACT

A heat exchanger device for use with a solar energy system comprising at least one pair of substantially parallel enlarged heat exchange inlet conduits operatively coupled together within a fluid storage tank to receive heated fluid from an external source to heat fluid within the storage tank and a reduced outlet conduit coupled to the lower portion of the substantially parallel enlarged heat exchange inlet conduits to remove the fluid from the fluid storage tank.

1 Claim, 3 Drawing Figures

HEAT EXCHANGE DEVICE

BACKGROUND OF THE INVENTION

1. Field of the Invention

A heat exchange device for a relatively low pressure, low velocity heat exchange system such as a solar energy system or the like.

2. Description of the Prior Art

Typically hot water heaters for domestic use and the like employ electricity or gas as a heat source. Relatively high pressure pumps from 20 to 65 pounds per square inch are used in combination with these systems. The resultant high pressure, high velocity systems are sufficient to reduce the problems and significance of air lock within the fluid conduits.

In contrast, solar systems commonly employ relatively lower pressure (1 to 2 psi), low fluid velocity systems. Unfortunately, many existing heat exchangers are so configured that air lock can be commonly experienced.

Thus a real need exists for a heat exchange device designed to provide maximum heat exchange and minimize the likelihood of air lock in low pressure, low fluid velocity systems.

SUMMARY OF THE INVENTION

The present invention relates to a heat exchange device for use with a solar energy system. More specifically the heat exchange device comprises a fluid storage tank configured to operatively house a fluid conduit means.

The fluid storage tank comprises enclosure to retain fluid in heat exchange relation relative to the fluid conduit means fixedly attached to the upper portion of the enclosure. Extending outwardly from the upper portion of the enclosure is an outlet supply conduit to supply heated fluid such as water for use in the home or the like.

The fluid conduit means comprises an inlet manifold coupled to an inlet heat exchange conduit. Extending downwardly from the inlet manifold is at least one pair of enlarged heat exchange conduits. Each enlarged heat exchange conduit comprises an enlarged tube to enhance heat transfer between the heated fluid from the solar energy collector or other external fluid heater and the fluid within the tank. The pair of enlarged heat exchange conduits comprises a first and second conduit having a fluid flow restrictor disposed within inlet manifold to balance the fluid flow between the heat exchange conduits. The lower portion of the heat exchange conduits are coupled to an outlet manifold. The upper or mid-portion of the outlet manifold to at least one reduced outlet heat exchange conduit comprising a small substantially tube extending upwardly to return the heating fluid to the solar energy collector or other external fluid heater after heat transfer.

In operation, the solar collector or other external fluid heater is coupled to the fluid storage tank by means of a pump through the inlet heat exchange conduit and outlet heat exchange conduit.

The heated fluid is delivered through the inlet manifold and flow restrictors equally to each of the enlarged heat exchange conduits. Since the heat exchange conduits are enlarged the heat transfer fluid flows at a relatively low rate to maximize heat exchange with the fluid with the fluid storage tank. As the heat exchange fluid reaches the lower portion of the exchange conduits, the heat exchange fluid is fed to the reduced outlet heat exchange conduit through the outlet manifold. The heat exchange fluid is then returned to the solar collector or other external fluid heater through the outlet heat exchange conduit. Since the outlet heat exchange conduit is reduced in diameter the heat exchange fluid exits as a relatively rapid rate to reduce any reverse heat exchange between then heat exchange fluid and fluid within the fluid storage tank. The fluid such as water is simply supplied to the home for use through outlet supply conduit in the conventional fashion.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a heat exchange device for use with a solar energy system. As described more fully hereinafter, the heat exchange device generally indicated as 10 comprises a fluid storage tank generally indicated as 12 configured to operatively house a fluid conduit means generally indicated as 14.

Figure 1:
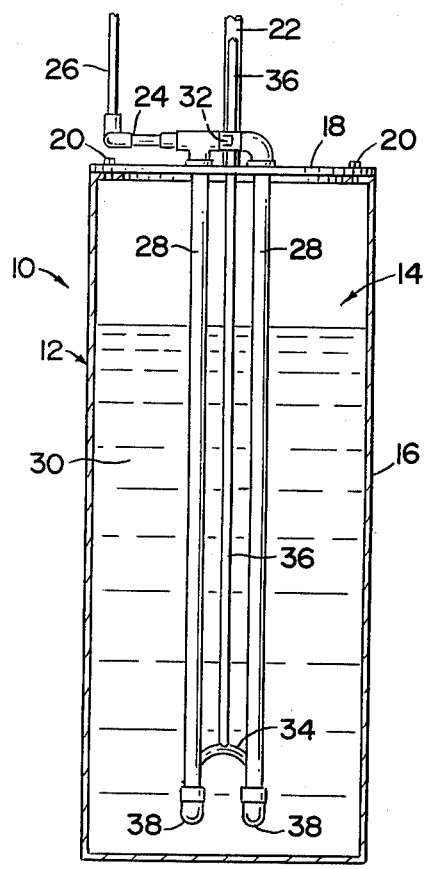
FIG. 1 is a cross-sectional front view of a heat exchange device.
Figure 2:
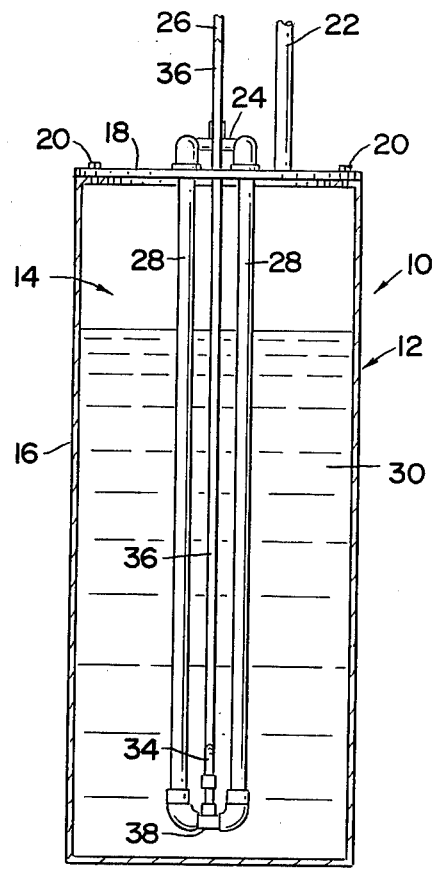
FIG. 2 is a cross-sectional side view of the heat exchange device.

As shown in FIGS. 1 and 2, the fluid storage tank 12 comprises a substantially cylindrical enclosure 16 to retain fluid in heat exchange relation relative to the fluid conduit means 14. The fluid conduit means 14 is fixedly attached to the upper portion of the enclosure 16 by circular mounting plate 18 by a plurality of fastening means each indicated as 20. Extending outwardly from the upper portion of enclosure 16 is outlet supply conduit 22 to supply heated fluid such as water for use in the home or the like.

Figure 3:
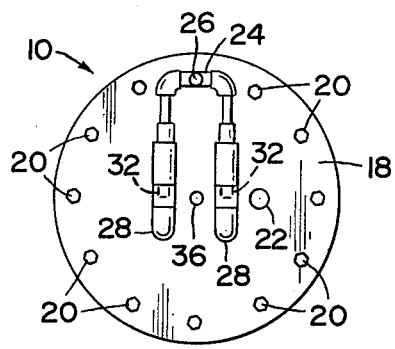
FIG. 3 is a top view of the heat exchange device.

As shown in FIGS. 1 through 3, the fluid conduit means 14 comprises a substantially U-shaped horizontally disposed inlet manifold 24 coupled to inlet heat exchange conduit 26. Extending downwardly from the substantially U-shaped horizontally disposed inlet manifold 24 is a first and second pair of substantially vertical enlarged heat exchange conduits each indicated as 28. Each enlarged heat exchange conduit 28 comprises an enlarged tube to enhance heat transfer between the heated fluid from the solar energy collector or other external fluid heater (not shown) and the fluid 30 within the tank 16. Each pair of enlarged heat exchange conduits 28 comprises a first and second conduit 28 having a fluid flow restrictor 32 disposed within inlet manifold 24 to balance the fluid flow between corresponding first and second heat exchange conduits 28 of each respective pair. The flow restrictors 32 may comprise fluid jets or similar devices to develop the necessary pressure differential. The lower portion of the first and second pair of heat exchange conduits 28 are coupled to an outlet manifold comprising a U-shaped substantially vertical outlet manifold 34. The upper or mid-portion of the U-shaped substantially vertical outlet manifold 34 is coupled to at least one reduced outlet heat exchange conduit comprising a small substantially vertically disposed tube 36 extending upwardly to return the heating fluid to the solar energy collector or other external fluid heater (not shown) after heat transfer.

In operation, the solar collector or other external fluid heater (not shown) is coupled to the fluid storage tank 12 by means of a pump (not shown) through inlet heat exchange conduit 26 and outlet heat exchange conduit 26.

The heated fluid is delivered through the inlet manifold 24 and flow restrictors 32 equally to each of the enlarged heat exchange conduits 28 which are substantially perpendicular to the inlet manifold 24. Since the heat exchange conduits 28 are enlarged the heat transfer fluid flows at a relatively low rate to maximize heat exchange with the fluid 30 with the fluid storage tank 12. As the heat exchange fluid reaches the lower portion of each pair of corresponding heat exchange conduits 28 coupled together by U-shaped fluid coupling elements 38, the heat exchange fluid is fed to the reduced outlet heat exchange conduit 36 through outlet manifold 34 disposed substantially parallel to heat exchange conducts 28. The heat exchange fluid is then returned to the solar collector or other external fluid heater (not shown) through the outlet heat exchange conduit 36. Since the outlet heat exchange conduit 36 is reduced in diameter the heat exchange fluid exits at a relatively rapid rate to reduce any reverse heat exchange between then heat exchange fluid and fluid within the fluid storage tank 12. The fluid such as water 30 is simply supplied to the home for use through outlet supply conduit 22 in the conventional fashion.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Now that the invention has been described,

What is claimed is:

1. A heat exchange device to heat a fluid therein from a second fluid circulated from an external heater source, said heat exchange device includes a first and second pair of substantially vertically disposed enlarged heat exchange conduits coupled to an inlet manifold and a pair of fluid flow restrictors disposed in said inlet manifold between said first and said second pair of said substantially vertically disposed enlarged heat exchange conduits, said heat exchange device further includes an outlet manifold coupled to the lower portion of said first and second pair of enlarged substantially vertically disposed heat exchange conduit, said outlet manifold comprising a substantially vertically disposed U-shaped conduit coupled to the lower portion of said pair of enlarged heat exchange conduit said heat exchange device further includes a reduced substantially vertically disposed outlet conduit coupled to the upper portion of said substantially U-shaped conduit to feed fluid therefrom to the external heater source.

* * * * *